US006639680B1

(12) United States Patent
Numai

(10) Patent No.: US 6,639,680 B1
(45) Date of Patent: Oct. 28, 2003

(54) RING LASER GYRO AND DRIVING METHOD THEREFOR WITH IMPROVED DRIVING CURRENT

(75) Inventor: Takahiro Numai, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 09/708,585

(22) Filed: Nov. 9, 2000

(30) Foreign Application Priority Data

Nov. 11, 1999 (JP) .............................. 11-321501

(51) Int. Cl.[7] .............................................. G01C 19/66
(52) U.S. Cl. ........................ 356/459; 356/460
(58) Field of Search ............................. 356/459, 461, 356/472; 372/94, 38.07

(56) References Cited

U.S. PATENT DOCUMENTS

| 4,431,308 A | | 2/1984 | Mitsuhashi et al. | |
|---|---|---|---|---|
| 4,661,964 A | * | 4/1987 | Haavisto | 356/461 |
| 4,913,548 A | | 4/1990 | Vick | |
| 5,331,403 A | * | 7/1994 | Rosker et al. | 356/459 |
| 5,390,019 A | * | 2/1995 | Fritze et al. | 356/459 |
| 5,764,681 A | * | 6/1998 | Ballantyne et al. | 372/94 |

FOREIGN PATENT DOCUMENTS

| JP | 57-043486 | 3/1982 |
|---|---|---|
| JP | 59-041883 | 3/1984 |
| JP | 02-126680 | 2/1990 |
| JP | 04-174317 | 6/1992 |
| JP | 05-288556 | 11/1993 |
| JP | 6-38529 | 5/1994 |

OTHER PUBLICATIONS

J. Liang, et al., "Unidirectional Operation of Waveguide Diode Ring Lasers," Applied Physics Letters, vol. 70, No. 10, pp. 1192–1194 (Mar. 10, 1997).

* cited by examiner

*Primary Examiner*—Samuel A. Turner
(74) *Attorney, Agent, or Firm*—Fitzpatrick, Cella, Harper & Scinto

(57) ABSTRACT

To make a time averaged value of a driving current small. After a current $I_1$ of a first current value not less than an oscillation threshold is injected to a semiconductor laser gyro, a current $I_2$ of a second current value smaller than the first current value is injected.

24 Claims, 7 Drawing Sheets

RING LASER GYRO AND DRIVING METHOD THEREFOR WITH IMPROVED DRIVING CURRENT

BACKGROUND OF THE INVENTION

1. Field of the Invention

The present invention relates to a semiconductor laser gyro and its driving method and, in particular, to a method for driving the semiconductor laser gyro for generating a laser oscillation by injecting a current.

2. Related Background Art

In the past, there have been known mechanical gyros having rotators and vibrators or optical gyros for detecting the angular velocity of a moving object. Since the optical gyros, in particular, are capable of starting instantaneously and have wide dynamic ranges, innovation is being brought about in the field of gyro technology. The optical gyros include laser gyros, optical fiber gyros, passive resonator gyros and the like. Among them, a development of a laser gyro employing a gas laser was first undertaken and it has been already put to practical use in aircrafts and the like. Recently, as a small and highly accurate laser gyro, a semiconductor laser gyro integrated on a semiconductor substrate has been proposed, for which known literature is available in the form of Japanese Patent Application Laid-Open No. 5-288556.

In order to increase a detecting sensitivity for the angular velocity, when a length of a ring cavity of a ring laser is taken as L and a closed area surrounded by the optical path as S, S/L is made large, by which a beat frequency accompanied by a rotation may be increased. However, there was a problem in that a driving current becomes large if S/L is made large in the semiconductor laser gyro. This is because the start of a laser oscillation is determined by a carrier concentration in an active layer, and the driving current is increased in proportion to the area of the active layer.

SUMMARY OF THE INVENTION

An object of the present invention is to provide a semiconductor laser gyro in which the time average value of the driving current is small, and a method for driving the semiconductor laser gyro.

According to an aspect of the present invention, there is provided a ring laser gyro having means for injecting a current of a first current value not less than an oscillation threshold value to a ring laser gyro, and then injecting a current of a second current value smaller than the first current value to the ring laser gyro. In the ring laser gyro, a beat signal can be detected even in a state wherein the current of the second current value is injected and flowing. In the ring laser gyro, circularly counterpropagating first and second laser beams may be different from each other in the oscillation frequency when the gyro is stationary. Further, the second current value may be lower than the oscillation threshold value. Also, in this embodiment of the ring laser gyro, a beat signal can be detected even in a state wherein the current of the second current value is injected and flowing.

According to another aspect of the present invention, there is provided a method for driving a ring laser gyro, which involves injecting a current of a first current value not less than an oscillation threshold value to a semiconductor laser gyro, and then injecting a current of a second current value smaller than the first current value.

According to still another aspect of the present invention, there is provided a method for driving a ring laser gyro, which involves injecting a current of a first current value not less than an oscillation threshold value to a semiconductor laser gyro, and then injecting a current of a second current value smaller than the first current value, which is taken as one pair of operations, and repeating the pair of operations plural times. The method for driving a ring laser gyro may further comprise injecting a current of the first current value in the next pair of the operations while the laser beams are propagating inside the ring resonator after the injecting step of the current of the second current value, wherein the semiconductor laser gyro starts a laser oscillation by the injected current, and propagates laser beams inside the ring resonator.

In the above methods for driving a ring laser gyro, the current of the second current value may be not less than a current value where a medium becomes transparent.

In the above method for driving a ring laser gyro, the current of the second current value may be not less than the oscillation threshold current.

In the above method for driving a ring laser gyro, a sidewall of the semiconductor laser gyro is a surface with total reflection for oscillated laser beams.

The operation of the above configuration will be described by using an equation. First, the beat frequency $\Delta f$ in the laser gyro can be expressed as follows by using a cavity length L of the ring laser, a closed area S surrounded by the optical path, an oscillation wavelength $\lambda$ and an angular velocity $\Omega$:

$$\Delta f = \frac{4S}{\lambda L} \Omega \quad (1)$$

This equation demonstrates that S/L should be increased in order to make the beat frequency $\Delta f$ large. However, if S/L is made large in the semiconductor laser gyro, a driving current becomes large. This is because the start of the laser oscillation is determined by the carrier concentration in the active layer. Consequently, the driving current is increased in proportion to the area of the active layer. In relation to this, the present invention proposes a driving method in which a time average value of the driving current is small and its structure.

Rate equations concerning a photon density S of the laser beam, a photon density $S_{SP}$ of a spontaneous emission and the carrier concentration n can be given by the following equations:

$$\frac{dS}{dt} = G(n)S + \beta_s \frac{n}{\tau_r} - \frac{S}{\tau_{ph}} \quad (2)$$

$$\frac{dS_{sp}}{dt} = \frac{n}{\tau_r} - \frac{S_{sp}}{\tau'_{ph}} \quad (3)$$

$$\frac{dn}{dt} = \frac{I}{eV} - G(n)S - \frac{n}{\tau_n} + G'(n)S_{sp} \quad (4)$$

wherein G(n) denotes a gain coefficient for the laser beam, $\beta_s$ a spontaneous emission coupling factor, $\tau_r$ a radiative recombination lifetime of the carrier, $\tau_{ph}$ a photon lifetime for the laser beam, $\tau_{ph}'$ a photon lifetime for the spontaneous emission, I an injection current, e an elementary electric charge, V a volume of the active layer, $\tau_n$ a carrier lifetime, and G(n)' an absorption coefficient for the spontaneous emission.

From the above, a steady state d/dt=0 is considered. Since the spontaneous emission coupling factor $\beta_s$ is in the order of $10^{-4}$ to $10^{-6}$, if the contribution of $\beta_s$ is ignored in equation (2), the following relation holds:

$$G(n_{th}) = \frac{1}{\tau_{ph}} \tag{5}$$

Also, from equation (4), the oscillation threshold current $I_{th}$ becomes as follows:

$$I_{th} = \frac{eV}{\tau_n} n_{th} [1 - G'(n_{th})\tau'_{ph}] \tag{6}$$

Here, $n_{th}$ is a carrier concentration of the oscillation threshold, and if the contribution of a nonradiative recombination is negligible, the following equation:

$$\tau_r \cong \tau_n$$

is established.

Moreover, from equation (2) and equation (4), the photon density S in $I \geq I_{th}$ is given by the following equation:

$$S = \tau_{ph} \left[ \frac{I}{eV} - \frac{n_{th}}{\tau_n} + G'(n) \frac{\tau'_{ph}}{\tau_r} n_{th} \right] \tag{7}$$

Now, when injection current I is once taken as a value $I_1$ not less than the oscillation threshold current $I_{th}$, the laser oscillation begins. If it is given an in-plane rotation including a ring resonator in this state, the circularly counterpropagating laser beams interfere with each other to generate a beat. By detecting this beat frequency, the angular speed of the rotation is known.

Next, after the laser oscillation, injection current I is lowered to $I_2$ ($<I_1$). The laser beam circularly propagates inside the ring resonator after the laser is oscillated. Particularly, if the sidewall of the element is a total reflective surface, the laser beam is not emitted outside the ring resonator but remains inside the resonator all the time. That is, the photon lifetime $\tau_{ph}$ for the laser beam becomes long, and even if injection current I is lowered, the laser beam can be kept propagating inside the ring resonator. As a result, the time averaged value of the current injected to the element can be lowered, and a load of the current source can be lowered which, at the same time, contributes to the lowering of a consumption power.

The injection current $I_2$ may be smaller than the oscillation threshold current $I_{th}$. In this case, however, the laser oscillation is discontinued as time elapses and a signal ends up being not outputted. Nevertheless, by making injection current $I_2$ larger than injection current $I_0$ where a medium becomes transparent, an amplification by stimulated emission takes place. For this reason, the time where the laser beam exists inside an optical resonator can be prolonged. Moreover, if injection current $I_2$ is not less than the oscillation threshold current $I_{th}$ ($I_2 \geq I_{th}$), the laser oscillation continues once the laser is oscillated.

In order to lower the consumption power while the laser oscillation is continued all the time, the following method is effective. That is, an operation is repeated, which operation consists of restoring the injection current I to a value $I_1$ not less than the oscillation threshold current $I_{th}$ during the time when the laser beams propagate inside the ring resonator and then making injection current I lowered to $I_2$ ($<I_1$). In this manner, the laser beams of an approximately constant optical intensity can be kept existing inside the optical resonator. As a result, the beat signal of the same magnitude can be obtained all the time. Needless to say, the consumption power in this method is small in comparison to that at the time when the constant current $I_1$ is continuously injected to the laser gyro. It will be sufficient if the interval between current $I_1$ and current $I_2$ is that enabling beat signals to be consecutively obtained.

And, if the sidewall of the element is a total reflective surface, the photon lifetime $\tau_{ph}'$ for the spontaneous emission also becomes long. In the case of the semiconductor laser, while a gain is increased with the injection current, a population inversion is not produced for an optical transition with an energy much higher than a gain peak, and absorption takes place. In the spontaneous emission, a photon whose transition energy is inside the absorption region is absorbed, during which it is kept remaining inside the ring resonator and reproduces the carrier. This is photon recycling and has an effect of prolonging the carrier lifetime. As a result, when injection current I is made small, the time when the laser beam remains inside the ring resonator becomes long. Moreover, similar to a function of a second term of equation (6), the lowering of the oscillation threshold current $I_{th}$ is achieved.

Needless to say, even if the sidewall of the element is not a total reflective surface, if its reflectivity is great, the same effect can be expected. However, the greater the reflectivity of the sidewall is, the smaller the oscillation threshold concentration $n_{th}$ becomes and a slope effect for the laser beam inside the optical resonator becomes great simultaneously. The effect of the photon recycling also becomes efficient. Note that, in the ring laser having a ridge waveguide, a loss difference arises in the counterpropagating laser beams if non-symmetric tapered areas are provided as shown in FIG. 8. Due to the loss difference, the oscillation frequencies of the counterpropagating laser beams are different from each other. In this case, the beat signal ($f_0$) can be obtained even when the gyro is stationary. By comparing $f_0$ with the signal, a rotating direction of the gyro can also be detected. However, also with the aim of avoiding a lock-in phenomenon, it is desirable to provide the tapered areas so as to let the difference in oscillation frequency between the counterpropagating laser beams amount to not less than 100 Hz, desirably not less than 1 kHz, or more desirably not less than 10 kHz. Further, if the difference in optical intensity between the counterpropagating laser beams is too large, a degree of interference of the beams may be low, whereby no beat may be generated. Accordingly, it is desirable to provide the tapered areas so as to let the lower optical intensity amount to not less than 30%, desirably not less than 50%, or more desirably not less than 80%, of the higher one.

DETAILED DESCRIPTION OF THE PREFERRED EMBODIMENTS

Hereinafter, the embodiments of the present invention will be described with reference to the accompanying drawings. Note that, in the following embodiments, though descriptions will be made for cases where the semiconductor laser is used, the present invention can be used also in the gas laser.

First Embodiment

Figure 1A:
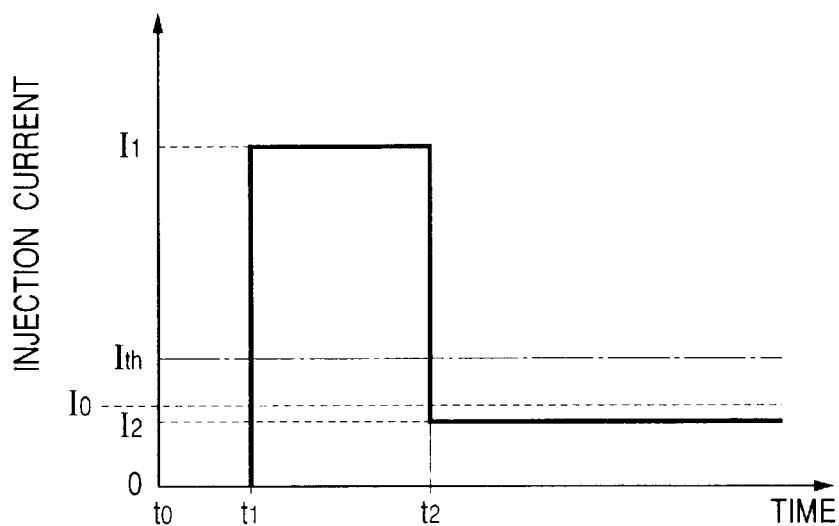
FIGS. 1A and 1B are drawings explaining a timing chart of an injected current showing a method for driving the semiconductor laser gyro according to the embodiment of the present invention.
Figure 1B:
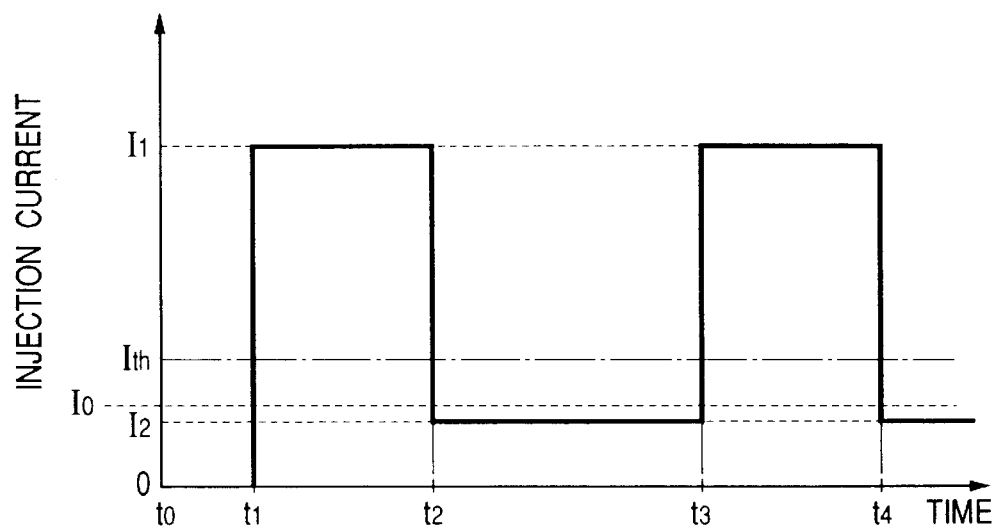

FIGS. 1A and 1B are drawings most properly showing characteristics of the first embodiment of the present invention and showing a time variation of current I injected to the semiconductor laser gyro. In the drawings, $I_0$ denotes an injection current where the medium becomes transparent and $I_{th}$ denotes an oscillation threshold current.

As shown in FIG. 1A, at a time $t_o$, the current is not injected to the semiconductor laser gyro. And at the time $t_1$, current $I_1$ ($>I_{th}$) is injected to the semiconductor laser gyro. Next, at a time $t_2$ ($>t_1$), the current is reduced to $I_2$ ($<I_0 <I_1$). At this time, a beat signal can be detected at the time of a rotation for 0.5 s from the time $t_2$. Needless to say, as shown in FIG. 1B, when the injection current is increased to $I_1$ within 0.5 s after the injection current is lowered to $I_2$, the beat signal can be detected all the time at the time of a rotation.

Second Embodiment

Figure 2A:
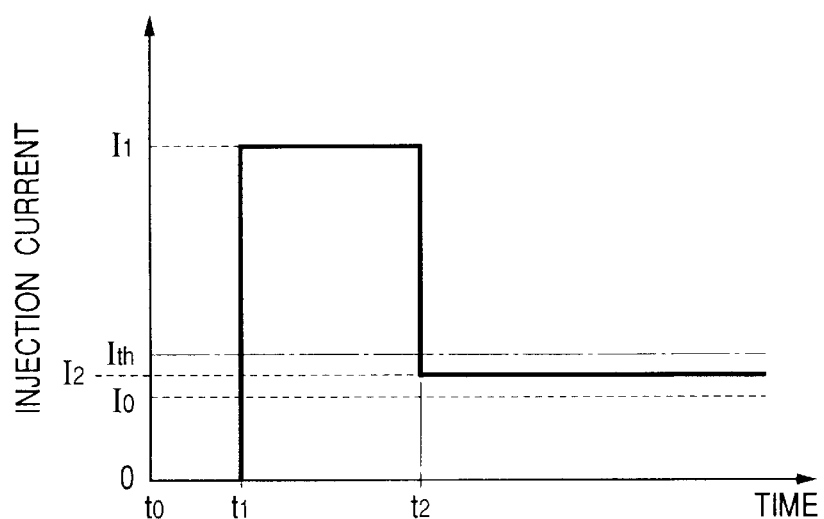
FIGS. 2A and 2B are drawings explaining a timing chart of an injected current showing a method for driving the semiconductor laser gyro according to the embodiment of the present invention.
Figure 2B:
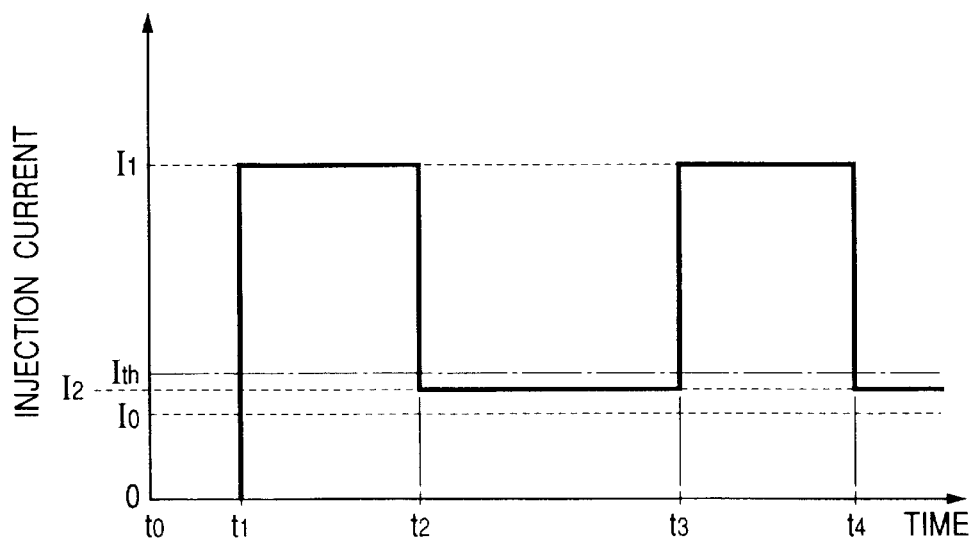

FIGS. 2A and 2B are drawings most properly showing characteristics of the second embodiment of the present invention and showing a time variation of current I injected to the semiconductor laser gyro in the case of $I_2 \geq I_0$. In the case of FIG. 2A, the medium becomes transparent even at and after the time $I_2$ and the laser beams therefore remain inside the ring resonator for 1 s, the time longer than that of the first embodiment. And, as shown in FIG. 2B, when the injection current is increased to $I_1$ within 1 s after the injection current is lowered to $I_2$, the beat signal can be detected all the time at the time of a rotation.

Third Embodiment

Figure 3A:
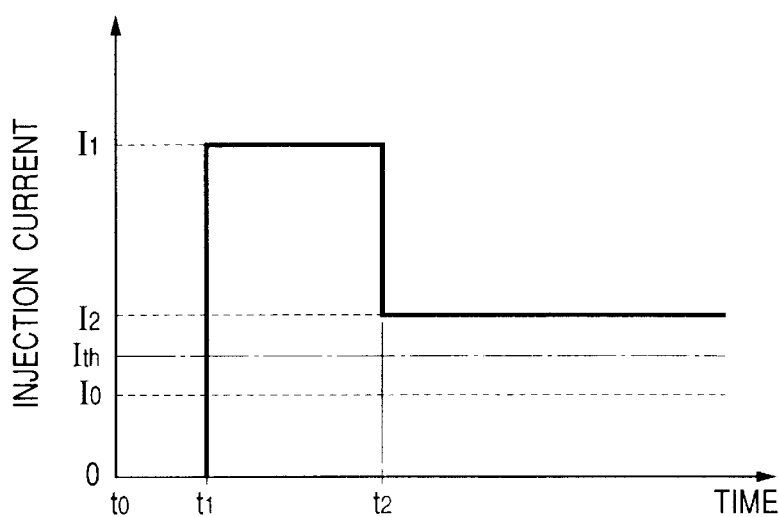
FIGS. 3A and 3B are drawings explaining a timing chart of an injected current showing a method for driving the semiconductor laser gyro according to the embodiment of the present invention.
Figure 3B:
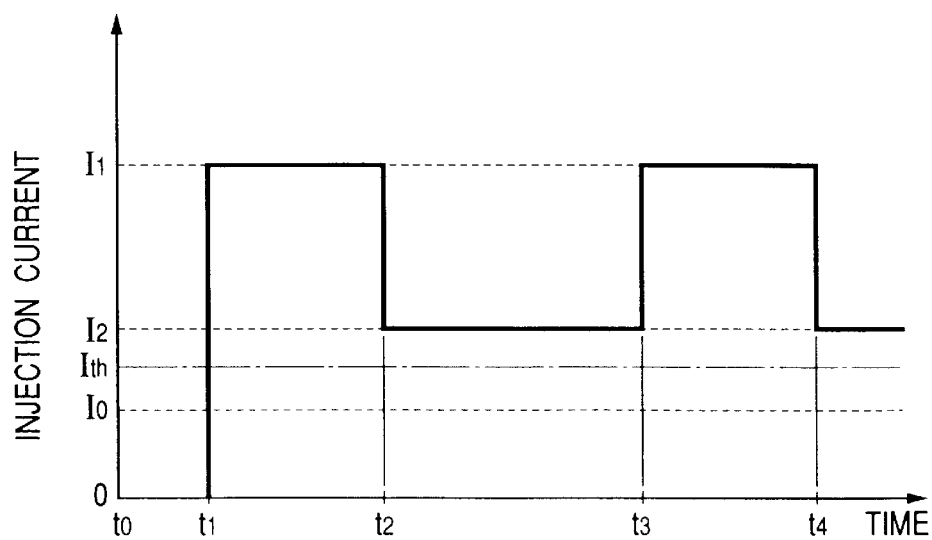

FIGS. 3A and 3B are drawings most properly showing characteristics of the third embodiment of the present invention and showing a time variation of current I injected to the semiconductor laser gyro in the case of $I_2 \geq I_{th}$. In the case of FIG. 3A, even at and after the time $t_2$, the gain of the medium exceeds the loss of the ring resonator, and therefore, the laser oscillation continues all the time, thereby the beat signal can be obtained. Moreover, a signal is greater than that at a time when the current value is abruptly increased from zero to $I_2$, and the greater signal continues for 5 s. And, as shown in FIG. 3B, when the injection current is increased to $I_1$ within 5 s after the injection current is lowered to $I_2$, the beat signal of the same magnitude can be detected all the time.

Fourth Embodiment

Figure 4A:
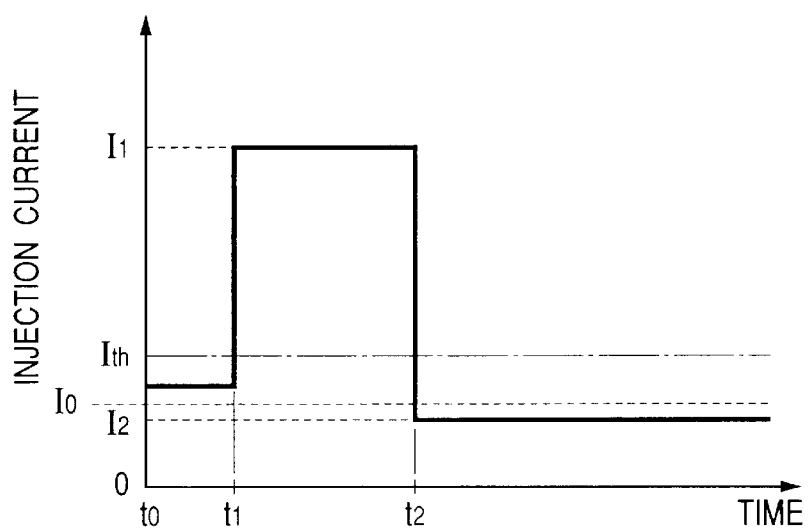
FIGS. 4A and 4B are drawings explaining a timing chart of an injected current showing a method for driving the semiconductor laser gyro according to the embodiment of the present invention.
Figure 4B:
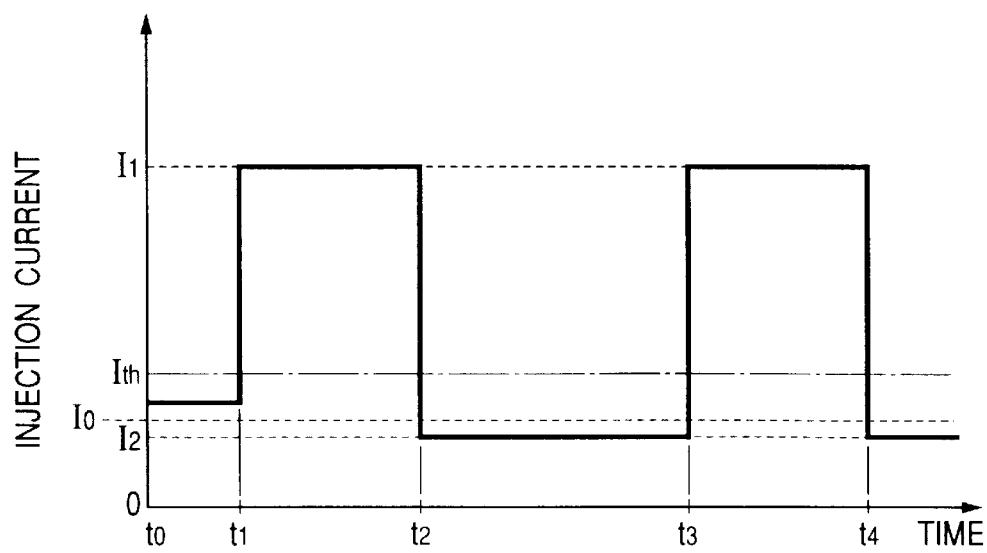

FIGS. 4A and 4B are drawings most properly showing characteristics of the fourth embodiment of the present invention and showing the case where, at the time $t_0$, a bias current is injected to the semiconductor laser gyro. As shown in FIG. 4A, at the time $t_1$, the current $I_1$ ($>I_{th}$) is injected to the semiconductor laser gyro. At this time, since the carrier is already injected to an active layer by the bias current, a carrier lifetime in the active layer becomes short. As a result, an oscillation delay time becomes shorter than that of the first embodiment and the start of the element becomes faster. Next, at the time $t_2$ ($>t_1$), when the current is reduced to $I_2$ ($<I_0 <_I$), the beat signal can be detected at the time of a rotation for 0.5 s from the time $t_2$. Needless to say, as shown in FIG. 4B, when the injection current is increased to $I_1$ within 0.5 s after the injection current is lowered to $I_2$, the beat signal of the same magnitude can be detected all the time.

Fifth Embodiment

Figure 5A:
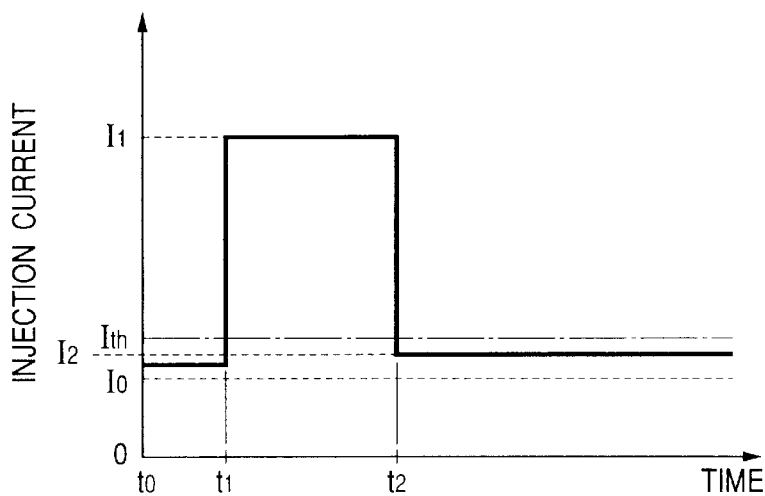
FIGS. 5A and 5B are drawings explaining a timing chart of an injected current showing a method for driving the semiconductor laser gyro according to the embodiment of the present invention.
Figure 5B:
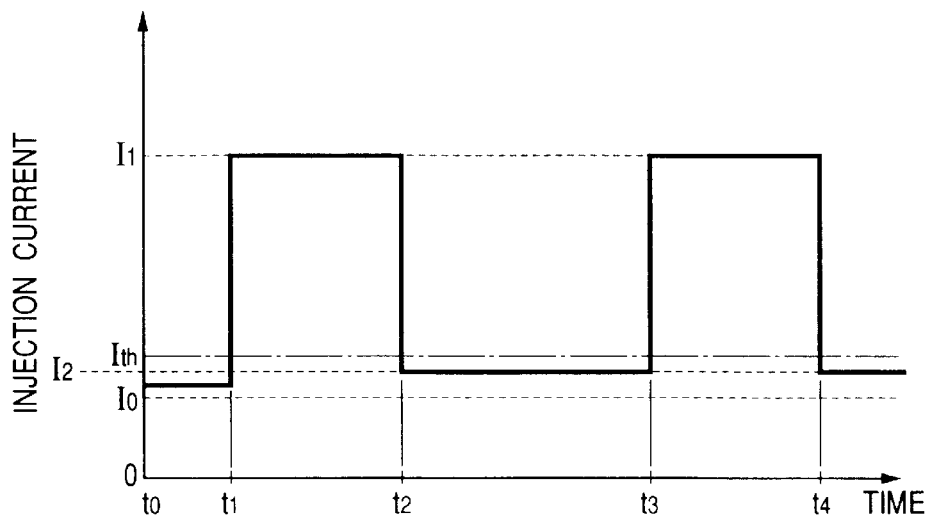

FIGS. 5A and 5B are drawings most properly showing characteristics of the fifth embodiment of the present invention and showing the case where, at the time $t_0$, a bias current is injected to the semiconductor laser gyro. As shown in FIG. 5A, at the time $t_1$, current $I_1$ ($>I_{th}$) is injected to the semiconductor laser gyro. At this time, since the carrier is already injected to an active layer by the bias current, a carrier lifetime in the active layer becomes short. As a result, an oscillation delay time becomes shorter than that of the second embodiment and the start of the element becomes faster. And, the medium is transparent even at and after the time $t_2$ and the laser beams therefore remain inside the ring resonator for 1 s, the time longer than that of the first embodiment. And, in FIG. 5B, when the injection current is increased to $I_1$ within 1s after the injection current is lowered to $I_2$, the beat signal of the same magnitude can be detected all the time.

Sixth Embodiment

Figure 6A:
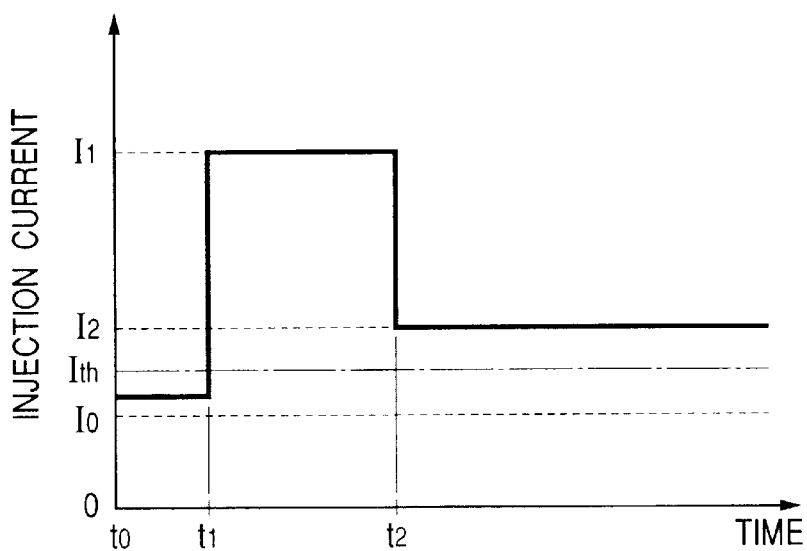
FIGS. 6A and 6B are drawings explaining a timing chart of an injected current showing a method for driving the semiconductor laser gyro according to the embodiment of the present invention.
Figure 6B:
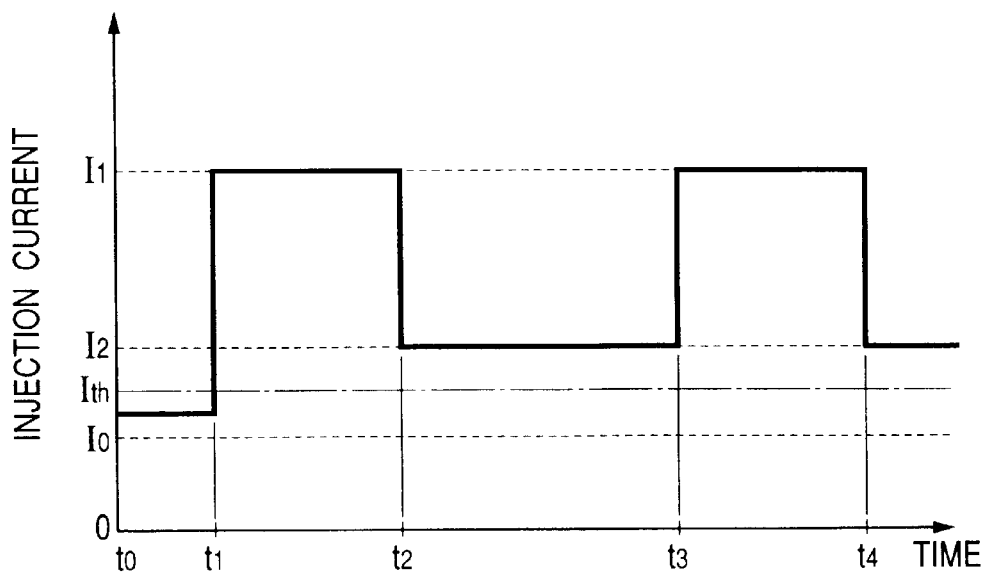

FIGS. 6A and 6B are drawings most properly showing characteristics of the sixth embodiment of the present invention and showing the case where, at the time $t_0$, a bias current is injected to the semiconductor laser gyro. As shown in FIG. 6A, at the time $t_1$, current $I_1$, ($>I_{th}$) is injected to the semiconductor laser gyro. At this time, since the carrier is already injected to an active layer by the bias current, a carrier lifetime in the active layer becomes short. As a result, an oscillation delay time becomes shorter than that of the third embodiment and the start of the element becomes faster. And, even at and after the time $t_2$, the gain of the medium exceeds the loss of the ring resonator, and therefore, the laser oscillation continues all the time, thereby the beat signal can be obtained. Moreover, a signal is greater than that at a time when the current value is abruptly increased from zero to $I_2$, and the greater signal continues for 5 s. And, as shown in FIG. 6B, when the injection current is increased to $I_1$ within 5 s after the injection current is lowered to $I_2$, the beat signal of the same magnitude can be detected all the time.

Seventh Embodiment

Figure 7A:
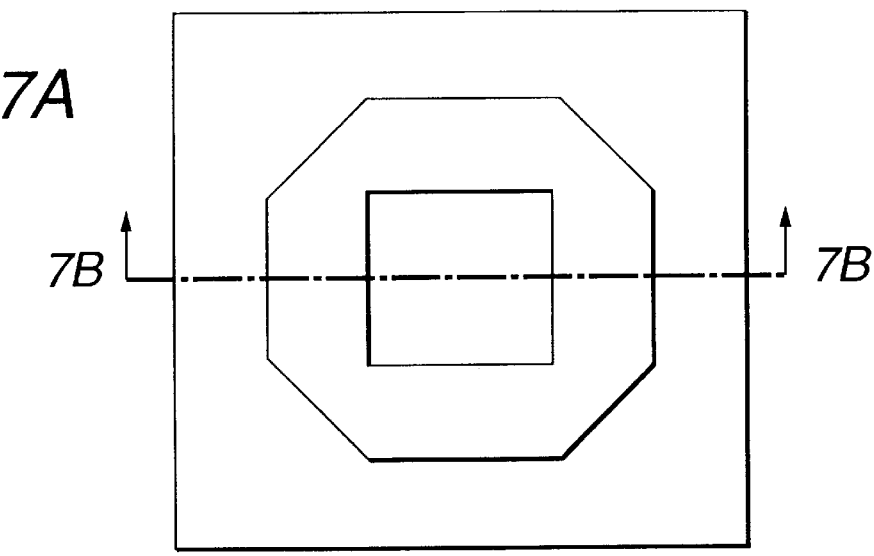
FIGS. 7A and 7B are a top view and a sectional view showing the structure of the semiconductor laser gyro according to the embodiment of the present invention.
Figure 7B:
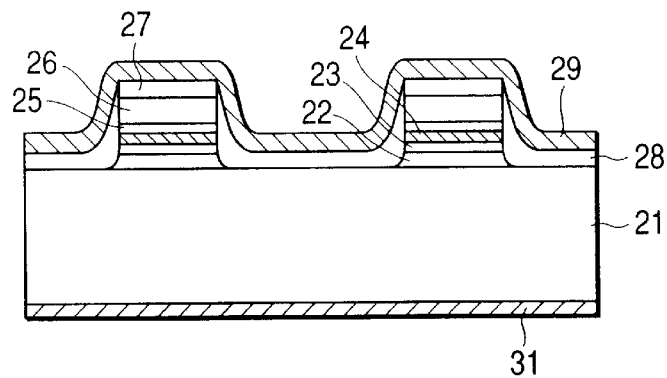

FIGS. 7A and 7B are drawings most properly showing characteristics of the seventh embodiment of the present invention, wherein FIG. 7A is a top view of the semiconductor laser gyro of the present invention and FIG. 7B is a cross sectional view cut along line 7B—7B of FIG. 7A. In the drawings, reference numeral 21 denotes a semiconductor substrate, reference numeral 22 a buffer layer, reference numeral 23 an optical guiding layer, reference numeral 24 an active layer, reference numeral 25 an optical guiding layer, reference numeral 26 a cladding layer, reference numeral 27 a cap layer, reference numeral 28 an insulating film, reference numeral 29 an anode and reference numeral 31 a cathode.

First, by using metal organic vapor phase epitaxial growth techniques, an InP buffer layer 22 (a thickness of 0.05 μm), an undoped InGaAsP optical guiding layer 23 having 1.3 μm composition (a thickness of 0.15 μm), and undoped InGaAsP active layer 24 having 1.55 μm composition (a thickness of 0.1 μm), an unhoped InGaAsP optical guiding layer 25 having 1.3 composition (a thickness of 0.15 μm), a p-InP cladding layer 26 (a thickness of 2 μm) and a p-InGaAsP cap layer 27 having 1.4 μm composition (a thickness of 0.3 μm) are grown on an n-InP substrate 21 (a thickness of 350 μm). After the epitaxial growth thereof, an optical waveguide is formed by etching so as to form a ring resonator. The stripe width is 5 μm and the side length of the ring cavity is 30 μm. A protective layer 28 for passivation is formed entirely on a water. Thereafter, in order to flow the current to the element, the protective layer 28 alone on the top of the cap layer 27 is removed. Then, Cr/Au is formed on the whole surface of the wafer as the anode 29. Note that, in order to dissipate heat efficiently, plated Au with a thickness of approximately more than several μms is applied on Cr/Au. On the other hand, AuGe/Ni/Au is formed on the n-InP substrate 21 as the cathode 31.

Now, since a semiconductor and a silicon nitride film are different from each other in refractive index, reflection takes place on the interface. If the refractive index of the semiconductor is taken as 3.5 and the refractive index of the silicon nitride film as 1.8, total reflection takes place when the angle formed by the normal line and the laser beam is not less than 30.95 degrees. Since the mode whose field satisfied the total reflection condition has a smaller oscillation threshold value by a mirror loss in contrast to other modes, an oscillation begins at low injection current. Moreover, because a gain concentrates on this oscillation mode, the oscillations of other modes are suppressed. In the semiconductor laser gyro of FIGS. 7A and 7B, the incident angle of the laser beam at four corners is 45 degrees and satisfies the total reflection condition. As a result, the oscillation threshold current $I_{th}$ at a room temperature is only 2 mA. Also, the current $I_0$ where the medium becomes transparent is 1.3 mA and the current $I_1$ at the time of a start is 5 mA. When this laser is stationary and a uniform current is injected to electrodes, the oscillation wavelength $\lambda_0$ in vacuum is 1.55 μm. When the semiconductor laser gyro is rotated clockwise at the speed of 30 degrees per second and a change in the terminal voltage is measured, the beat signal of a voltage amplitude of 10 mV or more and a frequency of 34.5 Hz is obtained.

Figure 8:
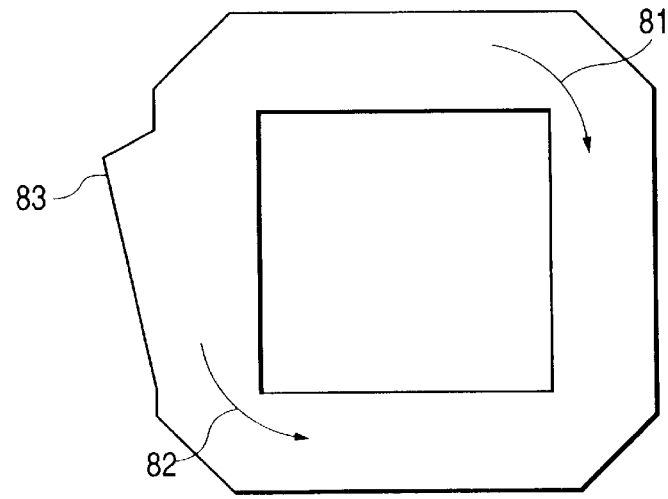
FIG. 8 is a top view showing one example of the structure of the semiconductor laser gyro according to the present invention.

Here, as semiconductor materials, those of InGaAsP system were used. However, whichever material system such as GaAs system, ZnSe system, InGaN system, AlGaN system and the like may be used. Also, with regard to the optical waveguide, the ring cavity shape may be not only square as shown in FIGS. 7A and 7B, but also hexagon, triangle or circle and the like. Also, as shown in FIG. 8, the semiconductor laser having the waveguide of a tapered shape 83 can be used. In this case, since the oscillation frequencies vary between clockwise light 81 and counter clockwise light 82, the beat signal can be obtained even when the gyro is stationary so that the rotational direction may be detected.

As described above, according to the present invention, the time averaged value of the driving current can be made small.

What is claimed is:

1. A ring laser gyro comprising:
   first means for injecting a first current having a first current value not less than an oscillation threshold value to said ring laser gyro;
   second means for injecting a second current having a second current value smaller than the first current value to said ring laser gyro; and
   an optical waveguide for propagating a first laser beam and a second laser beam,
   wherein the first laser beam and the second laser beam are circularly counterpropagated, and the first laser beam and the second laser beam have different oscillation frequencies when said ring laser gyro is stationary.

2. The ring laser gyro according to claim 1, having a detectable beat signal when the second current is injected and flowing.

3. The ring laser gyro according to claim 1, having a detectable beat signal when the second current is injected and flowing.

4. The ring laser gyro according to claim 1, wherein the second current value is lower than the oscillation threshold value.

5. A method for driving a ring laser gyro, comprising the steps of:
   injecting a first current having a first current value not less than an oscillation threshold value to the ring laser gyro, and
   injecting, after the first current is injected, a second current having a second current value, smaller than the first current value, to the ring laser gyro,
   wherein, with either of the first and second currents, a first laser beam and a second laser beam are circularly counterpropagated in the ring laser gyro, and the first laser beam and the second laser beam have different oscillation frequencies when the ring laser gyro is stationary.

6. The method for driving a ring laser gyro according to claim 5, wherein the second current value is not less than a current value where a medium becomes transparent.

7. The method for driving a rig laser gyro according to claim 6, wherein a sidewall of the semiconductor laser gyro is a total reflective surface for oscillated laser beams.

8. The method for driving a ring laser gyro according to claim 5, wherein the second current value is not less than the oscillation threshold current.

9. The method for driving a ring laser gyro according to claim 8, wherein a sidewall of the ring laser gyro is a total reflective surface for oscillated laser beams.

10. The method for driving a ring laser gyro according to claim 5, wherein a sidewall of the ring laser gyro is a total reflective surface for oscillated laser beams.

11. A method for driving a ring laser gyro comprising the steps of:
    injecting a first current having a first current value not less than an oscillation threshold value to the ring laser gyro;

injecting, after the first current is injected, a second current having a second current value smaller than the first current value to the ring laser gyro; and repeating both the injection of the first current and the injection of the second current at least once, wherein, with either of the first and second currents, a first laser beam and a second laser beam are circularly counterpropagated in the ring laser gyro, and the first laser beam and the second laser beam have different oscillation frequencies when the ring laser gyro is stationary.

12. A method for driving a ring laser gyro according to claim 11, wherein the ring laser gyro starts a laser oscillation by at least one of the first injected current and the second injected current, and propagates laser beams inside a ring resonator, further comprising the step of repeating both the injection of the first current and the infection of the second current at least once while the laser beams are propagating inside the ring resonator.

13. The method for driving a ring laser gyro according to claim 12, wherein the second current value is not less than a current value where a medium becomes transparent.

14. The method for driving a ring laser gyro according to claim 13, wherein a sidewall of the ring laser gyro is a total reflective surface for oscillated laser beams.

15. The method for driving a ring laser gyro according to claim 12, wherein the second current value is not less than the oscillation threshold current.

16. The method for driving a ring laser gyro according to claim 15, wherein a sidewall of the ring laser gyro is a total reflective surface for oscillated laser beams.

17. The method for driving a ring laser gyro according to claim 12, wherein a sidewall of the ring laser gyro is a total reflective surface for oscillated laser beams.

18. The method for driving a ring laser gyro according to claim 11, wherein the second current value is not less than a current value where a medium becomes transparent.

19. The method for driving a ring laser gyro according to claim 18, wherein a sidewall of the ring laser gyro is a total reflective surface for oscillated laser beams.

20. The method for driving a ring laser gyro according to claim 11, wherein the second current value is not less than the oscillation threshold current.

21. The method for driving a ring laser gyro according to claim 20, wherein a sidewall of the ring laser gyro is a total reflective surface for oscillated laser beams.

22. The method for driving a ring laser gyro according to claim 11, wherein a sidewall of the ring laser gyro is a total reflective surface.

23. The method for driving a ring laser gyro according to claim 5, wherein the ring laser gyro is a semiconductor laser gyro.

24. The method for driving a ring laser gyro according to claim 11, wherein the ring laser gyro is a semiconductor laser gyro.

* * * * *

UNITED STATES PATENT AND TRADEMARK OFFICE
CERTIFICATE OF CORRECTION

PATENT NO. : 6,639,680 B1
DATED : October 28, 2003
INVENTOR(S) : Takahiro Numai

It is certified that error appears in the above-identified patent and that said Letters Patent is hereby corrected as shown below:

Column 3,
Line 20, "$\tau_r \simeq \tau_n$" should read -- $\tau_r \simeq \tau_n$ --.

Column 4,
Line 9, "lifetime τph'" should read -- lifetime τ'ph --.

Column 5,
Line 54, "for 1 s," should read -- for 1s, --; and
Line 56, "within 1 s" should read -- within 1s --.

Column 6,
Line 21, ($<I_{o<I}$) should read -- ($<I_o <I_1$), --; and
Line 41, "for 1 s," should read -- for 1s, --.

Column 7,
Line 20, "unhoped" should read -- undoped --; and
Line 29, "water." should read -- wafer. --.

Column 8,
Line 51, "rig" should read -- ring --.

Signed and Sealed this

Thirteenth Day of July, 2004

JON W. DUDAS
*Acting Director of the United States Patent and Trademark Office*